Oct. 16, 1962
R. S. CAVE ET AL
3,058,199
CUTTING TOOL
Filed May 26, 1960
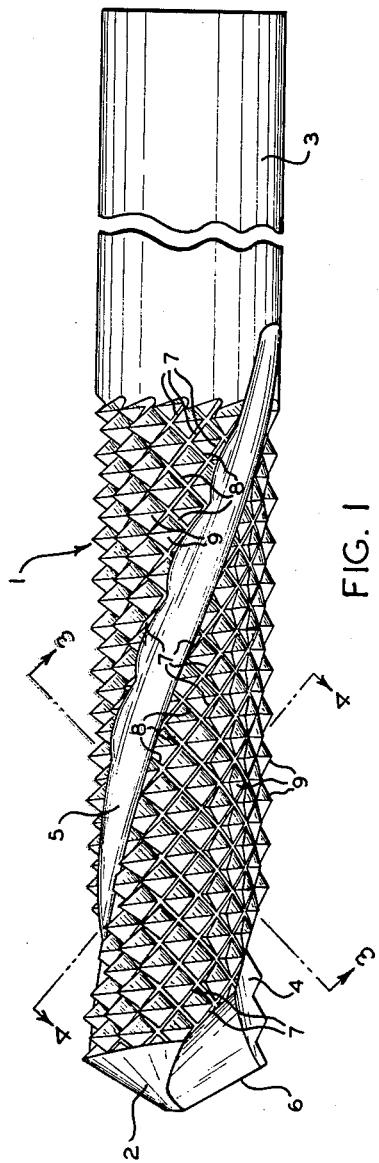
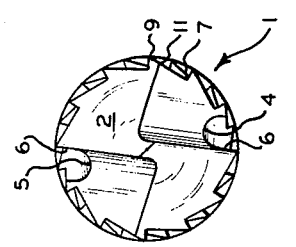
INVENTORS
ROBERT S. CAVE
DONALD D. ALEXANDER
BY
*Learman, Learman & McCulloch*
ATTORNEYS United States Patent Office 3,058,199
Patented Oct. 16, 1962

3,058,199
CUTTING TOOL
Robert S. Cave, Bay City, and Donald D. Alexander, Saginaw, Mich., assignors to Dixie Tool Industries, Inc., Saginaw, Mich., a corporation of Michigan
Filed May 26, 1960, Ser. No. 31,901
2 Claims. (Cl. 29—103)

This invention relates to cutting tools and more particularly to a rotary cutting tool which is capable of combining the functions of both routing and milling cutters.

In machining many workpieces it frequently becomes necessary to use both milling and routing operations to produce a finished workpiece. Conventional milling cutters are incapable of functioning properly as routers and conventional routing cutters cannot operate properly as milling cutters. Accordingly, it has been necessary heretofore to alternate between milling and routing operations, resulting in substantial loss of production time, which is reflected in high machining costs.

An object of this invention is to provide a tool having the characteristics of both a milling cutter and a routing cutter so that the tool is capable of operating efficiently in both axial and lateral directions of movement.

Another object of the invention is to provide a combined routing and milling cutter having pronounced lower chatter and tool pressure characteristics than are present in more conventional routing or milling tools.

Another object of the invention is to provide a combined routing and milling cutter having self-contained means for clearing chips resulting from operation of the tool.

A further object of the invention is to provide a cutting tool of the character described which is capable of prolonged and rapid operation without undue heating.

Other objects and advantages of the invention will be pointed out specifically or will become apparent from the following description when it is considered in conjunction with the accompanying drawing, in which:

FIGURE 1 is an elevational view of a tool constructed in accordance with the invention;

FIGURE 2 is an end view of the tool shown in FIGURE 1;

FIGURE 3 is a fragmentary sectional view taken on the line 3—3 of FIGURE 1; and

FIGURE 4 is a similar view taken on the line 4—4 of FIGURE 1.

A tool formed in accordance with the disclosed embodiment of the invention comprises a body member 1 composed of a piece of cylindrical steel, carbide, or the like and having a cutting end 2 and a shank end 3, the shank of the tool being adapted to be removably inserted in the rotary chuck of a milling or routing machine (not shown). In the disclosed embodiment of the invention, the body member 1 is provided with a pair of spirally arranged grooves or flutes 4 and 5 which extend from the cutting end 2 towards the shank end of the tool. Corresponding edges of the flutes are formed as cutting edges 6 at the cutting end of the body member so as to enable the tool to penetrate a workpiece upon axial feeding movement in the same manner that a conventional milling tool does. The tool illustrated in the drawing has a generally conical cutting end 2, but the cutting end may be formed in other shapes, e.g., as a flat end, fish tail or ball end mill, as will be understood.

A plurality of grooves or channels 7 of less depth than the flutes 4 are formed on the body member 1, beginning at the cutting end 2, so as to spiral in a direction corresponding generally to the direction that the flutes 4 spiral, but preferably the grooves 7 are at a different pitch so that they communicate with the flutes 4, as is clearly shown in FIGURE 1. The reason for the disclosed construction will be explained hereinafter.

Also formed on the body member 1, and beginning at the cutting end 2, is a plurality of additional grooves 8, also of less depth than the flutes 4, and which spiral about the body member in a direction generally oppositely to the direction that the grooves 7 spiral. The grooves 8 intersect or communicate with the flutes 4 and also with the grooves 7 and, as a result of the communication of the grooves 7 and 8, the body member is provided with a plurality of routing teeth 9 which spiral from the cutting end of the tool towards the shank end.

As is best indicated in FIGURE 3, each of the grooves 7 is generally V-shaped in that each has a generally radial wall 10 from the root of which an inclined wall 11 extends. As is shown in FIGURE 4, each groove 8 is similarly V-shaped and has a substantially radial wall 12 from the root of which an inclined wall 13 extends. As a result of the construction of the grooves 7 and 8, each of the routing teeth 9 has a generally pyramid or diamond shape with the points of the teeth located at the intersections of the grooves 7 and 8. Due to the presence of the grooves 7 and 8, each tooth point is spaced from the remaining points of the teeth.

As a result of the formation of the teeth by intersecting, oppositely spiralling grooves, the teeth are staggered relatively to one another so that no one tooth follows directly in the path of any other tooth upon either rotation or axial movement of the tool. As a consequence, the use of the tool as a milling cutter will not result in a line or thread being left on the workpiece.

When the tool is used as a routing cutter, the communication between the grooves 4 and 7 permits chips to be channeled to the grooves 4 and cleared by the latter so as to prevent clogging of the teeth 9. Moreover, since the teeth are formed on a spiral, any given tooth will be in cutting engagement with the workpiece for only a small portion of the rotation of the tool. Since a tooth will be in engagement with the workpiece for only a fraction of the tool's rotation, heat generated in a tooth may be dissipated over a major portion of the time of rotation of the body. Moreover, since the point of each tooth is spaced from the point of its adjacent teeth, the heat of one tooth is not transmitted to the adjacent teeth and consequently the tool as a whole remains fairly cool as compared with conventional routing cutters.

The ability of the tool to operate and remain fairly cool is particularly important when operating on some of the new plastic materials. For example, conventional routing cutters operated at the requested speed to rout a given plastic may become so overheated as to cause the adjacent edge of the workpiece to reach its melting point, whereupon the material may flow and produce a glazed surface. A glazed surface is not desirable in many instances and, in addition, retraversing of the surface by the same or other tools may effect chipping of the edge of the workpiece and result in its being discarded. Because of the ability of tools constructed in accordance with the invention to operate at their normal speeds without becoming unduly heated, the problems confronted in milling and routing many kinds of plastics have been overcome by the present invention.

In the illustrative embodiment of the invention, no specific pitch for any of the grooves 4, 7, and 8 has been mentioned for the reason that the pitch of such grooves will vary according to the kinds of materials upon which the machine tool is used. For the same reasons, no particular depth of the grooves 4, 7, and 8 has been referred to, but in general the grooves 7 and 8 will be of substantially equal depth and of less depth than the flutes 4. Moreover, the number of flutes 4 may vary according to the materials being worked upon, but at least one flute 4 is necessary to obtain the combined characteristics of a milling cutter and a routing cutter in a single tool.

The disclosed embodiment is representative of a presently preferred form of the invention but is intended to be illustrative rather than definitive thereof. The invention is defined in the claims.

We claim:

1. A combined routing and milling tool comprising a substantially cylindrical body member having a cutting end and a shank end, a plurality of spiraling flutes formed in said body member and extending from the cutting end thereof toward the shank end, corresponding edges of each of said flutes being formed as cutting edges at the cutting end of said body member; a plurality of spiraling grooves formed in said body member and extending from said cutting end thereof toward the shank end, there being a number of said grooves between each flute, each of said grooves spiraling in the same direction as said flutes but being formed on a pitch that differs from the pitch of said flutes so that said spiraling grooves communicate with said flutes; and a plurality of additional spiraling grooves formed in said body member and extending from the cutting end thereof toward the shank end, there being a number of said additional grooves between each flute, said additional grooves spiraling in a direction opposite to the direction of spiraling of the first mentioned grooves and intersecting the latter and said flutes to form cutting teeth on the periphery of said body member, said flutes having a depth greater than the depth of any of said spiraling grooves to enable said flutes to receive chips from said grooves, said flutes extending a greater distance toward said shank end of said body member than do any of said grooves.

2. A tool as set forth in claim 1 wherein said additional grooves are formed on the same pitch as the first mentioned grooves.

References Cited in the file of this patent

UNITED STATES PATENTS

| | | |
|---|---|---|
| 1,307,525 | Herbert | June 24, 1919 |
| 1,309,232 | Ahond | July 8, 1919 |
| 1,328,430 | Hathaway | Jan. 20, 1920 |
| 1,407,837 | Buckingham | Feb. 28, 1922 |
| 1,512,798 | Ramsay | Oct. 21, 1924 |
| 2,918,955 | Simas | Dec. 29, 1957 |

FOREIGN PATENTS

| | | |
|---|---|---|
| 245,301 | Great Britain | June 7, 1926 |
| 736,449 | Germany | June 17, 1943 |
| 771,631 | France | July 30, 1934 |
| 1,012,059 | Germany | Oct. 22, 1954 |